United States Patent [19]

Tokita et al.

[11] 4,214,305

[45] Jul. 22, 1980

[54] MULTI-PROCESSOR DATA PROCESSING SYSTEM

[75] Inventors: Yoshiaki Tokita; Keisuke Okajima, both of Yokohama, Japan

[73] Assignee: Hitachi, Ltd., Japan

[21] Appl. No.: 917,373

[22] Filed: Jun. 20, 1978

[30] Foreign Application Priority Data

Jun. 20, 1977 [JP] Japan .................................. 52-72075

[51] Int. Cl.$^2$ ............................................ G06F 13/00
[52] U.S. Cl. ..................................................... 364/200
[58] Field of Search ................................. 364/900, 200

[56] References Cited

U.S. PATENT DOCUMENTS

| | | | |
|---|---|---|---|
| 3,573,745 | 4/1971 | May, Jr. .................................. | 364/900 |
| 3,979,733 | 9/1976 | Williams ................................ | 364/200 |
| 4,031,520 | 6/1977 | Rohner .................................. | 364/900 |
| 4,034,347 | 7/1977 | Pobert .................................... | 364/200 |
| 4,050,058 | 9/1977 | Garlic ..................................... | 364/200 |
| 4,062,059 | 10/1977 | Suzuki ................................... | 364/900 |

OTHER PUBLICATIONS

Donovan, Operating System, 1974.

*Primary Examiner*—Gareth D. Shaw
*Assistant Examiner*—David Y. Eng
*Attorney, Agent, or Firm*—Craig & Antonelli

[57] ABSTRACT

A multi-processor data processing system comprises, in addition to a main memory unit which is common to a plurality of processors, a queue buffer which is common to the processors to store intercommunicating information for the processors, whereby when each processor completes a process, information relating to the process is stored in the main memory unit and the first address of this information or the intercommunicating information is transmitted to the queue buffer from which any idle or vacant processor reads out the intercommunicating information. The queue buffer accompanies an intercommunicating information read/write control unit which controls the transmission and reception of intercommunicating information between the processors and the queue buffer. In this way, intercommunicating processing is accomplished without requiring any access to the main memory unit and without requiring the operation of an operating system for intercommunication. Thus, the multi-processor data processing system has a reduced burden on the main memory unit and the operating system and is efficient and economical.

5 Claims, 4 Drawing Figures

FIG. 3 Bus Arbiter 500, 501; Preference Selection Circuit

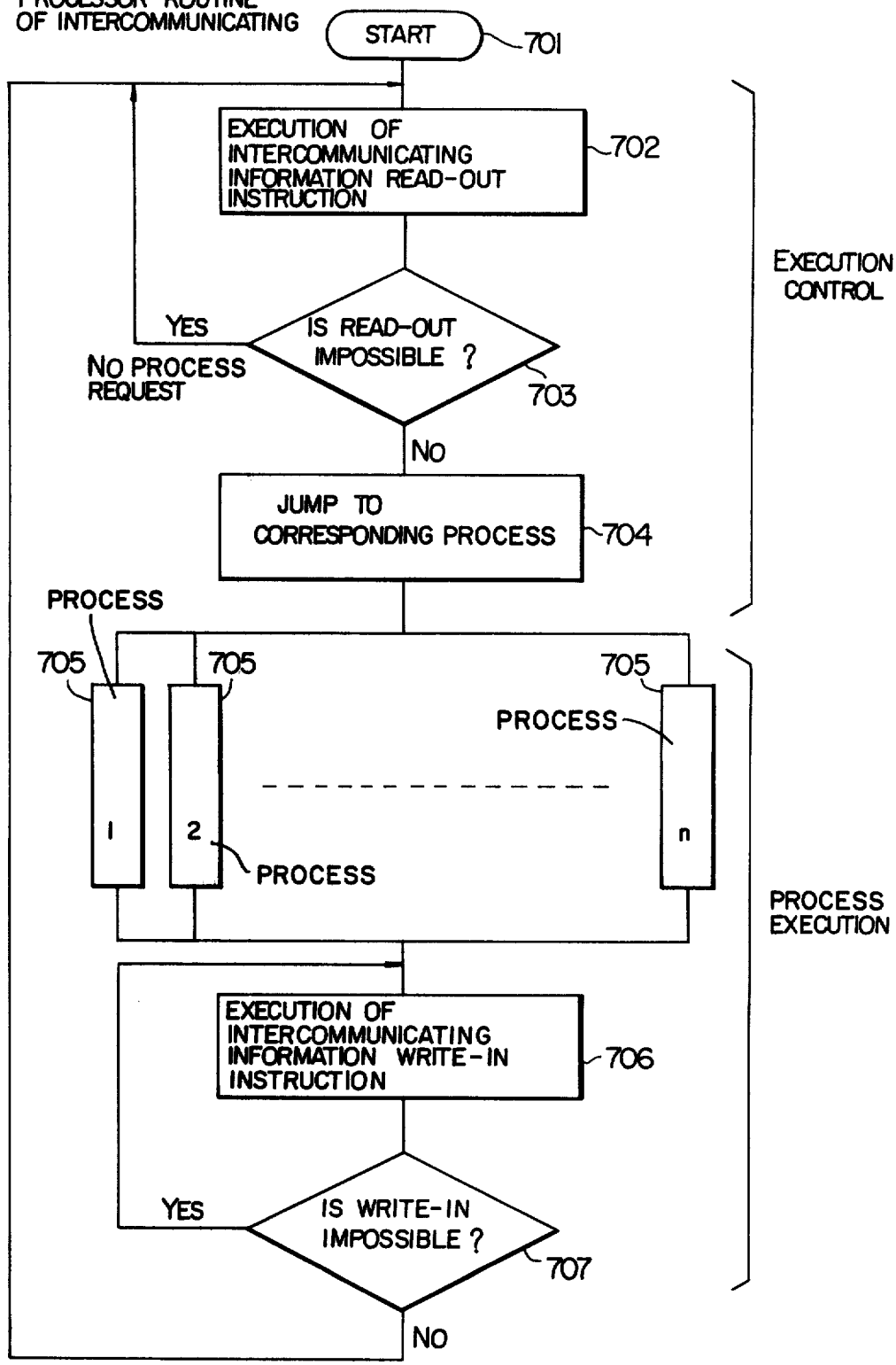

MULTI-PROCESSOR DATA PROCESSING SYSTEM

BACKGROUND OF THE INVENTION

The present invention relates to a multiprocessor data processing system in which processes can be intercommunicated among a plurality of processors and the intercommunication of processes can be effected in a firmware manner.

With multi-processor data processing systems known in the art, to effect intercommunication of processes among a plurality of processors (a process in which when one processor has executed a program of a certain magnitude, the remaining processing is taken over and executed by another processor), under control of an operating system (OS), a main memory unit which is provided common to all the processors stores the necessary information for intercommunication applied from any processor and the information is read out by another processor.

In accordance with this type of intercommunication of processes, as for example, in the case of an electronic switching system of the stored program control (SPC) type, when one processor performs a process of receiving a request for connection from a calling party and reading and storing the information relating to the calling party and the destination in the main memory unit, another processor takes over the rest of the work and connects the circuit between the calling party and the destination.

A disadvantage of this prior art method is that the intercommunication of processes requires accesses to the main memory unit and this interferes with accesses of other processors to the main memory unit which are necessary for the execution of processes by the other processors. Consequently, there results a reduction in the processing capacity of the multi-processor system on the whole.

SUMMARY OF THE INVENTION

It is an object of the present invention to eliminate accesses to a main memory unit which are required for the intercommunication of processes and also eliminate the need for intervention of the operating system for the intercommunication of processes and to thereby reduce the burden on the operating system.

Thus, in accordance with the present invention, there is provided, in addition to a main memory unit, an intercommunicating unit which is common to a plurality of processors and including a queue buffer adapted to store the necessary information (intercommunicating information) for the intercommunication of processes, whereby any processor which has completed a process sends an intercommunicating information to the queue buffer and any idle or vacant processor reads out the intercommunicating information from the queue buffer. Included in the intercommunicating unit is a control circuit which is connected to the queue buffer for controlling the operation of writing into and reading intercommunicating information from the queue buffer, and the control circuit controls the transmission and reception of intercommunicating information between the processors and the queue buffer. In this way, the need for accesses to the main memory unit is minimized and the required intercommunicating processing is executed by the processors and the new and novel control circuit.

BRIEF DESCRIPTION OF THE DRAWINGS

FIG. 3 is a functional circuit diagram of the bus arbiter shown in FIG. 1.

FIG. 4 is a flow chart for the execution of processes by the processors.

DESCRIPTION OF THE PREFERRED EMBODIMENTS

Figure 1:
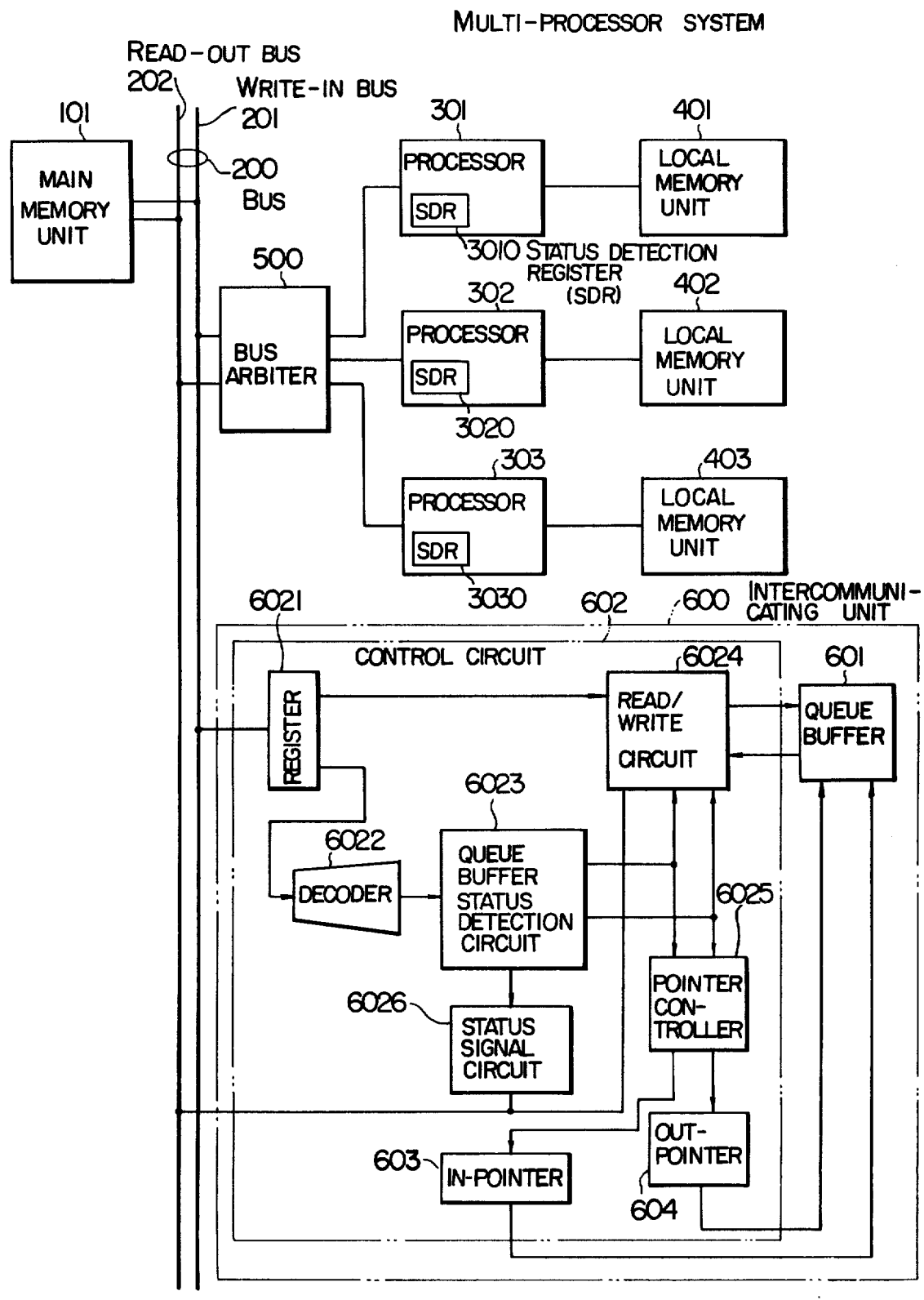
FIG. 1 is a block diagram showing a multiprocessor data processing system according to the present invention.

Referring now to FIG. 1, there is illustrated an embodiment of the multi-processor data processing system according to the invention. While the invention will now be described with reference to the illustrated embodiment including three processors 301, 302 and 303, the number of processors may of course be any number which is equal to or more than two. The processors 301 to 303 perform processes by accessing a main memory unit or main storage 101 in common. Although not directly related with the purposes of this invention, local memory units 401 to 403 are respectively provided for the processors 301 to 303 to store the programs used by the associated processors.

A bus arbiter 500 is connected to the processors 301 to 303 so that only a preferentially selected processor is connected to a bus 200 and the other processors are not connected to the bus 200. In this way, the processors 301 to 303 are selectively connected to the main memory unit 101 through the common bus 200. Also connected to the bus 200 is an intercommunicating unit 600. The intercommunicating unit 600 comprises a queue buffer 601 for storing intercommunicating information and a control circuit 602 for controlling the reading and writing of intercommunicating information. The queue buffer 601 is a storage device comprising a plurality of registers.

A register 6021 is a latch for information supplied from the processors 301 to 303. This information comprises an operation code which specifies either a writing or reading request for intercommunicating information as well as the intercommunicating information in the case of writing. With the present embodiment, what is meant by the term "intercommunicating information" is the following address. As mentioned previously, the initial process results in storage for example of the information relating to a calling party and a destination in a certain area of the main memory unit 101. The next process is performed by reading out this information. The first address of this area on the main memory unit 101 is called an intercommunicating information.

The operation code is translated by a decoder 6022, and then it is applied to a queue buffer status detection circuit 6023 which in turn determines whether the writing or reading is possible, that is, whether there is any idle register in the queue buffer 601 when the writing is requested and whether the queue buffer 601 contains any intercommunicating information to be read out when the reading is requested.

When neither the writing nor reading is possible, a signal indicative of this state is set from a status signal circuit 606 through a read-out bus 202 and the bus arbiter 500 in one of status detection registers (SDR) 3010, 3020 and 3030 corresponding to one of the processors 301 to 303 which transmitted the information.

When either the writing or reading is possible, under control of a read/write circuit 6024, the intercommunicating information is written into that register of the queue buffer 601 which is designated by an in-pointer 603 in the case of writing, and in the case of reading the intercommunicating information in that register of the queue buffer 601 which is designated by an out-pointer 604 is read out and delivered to the read-out bus 202. The stored intercommunicating information stored in the queue buffer 601 is controlled in a first-in first-out (FIFO) manner.

FIG. 4 illustrates a processing routine for the processors 301 to 303. Initially, any processor in the idle state (start 701) transmits to the register 6021 through the bus arbiter 500 and a write-in bus 201 information indicative of a request for intercommunicating information read-out. When a plurality of the processors simultaneously try to execute this instruction, the bus arbiter 500 selects one of the processors which is to be preferred to the others. When this occurs, the selected processor 301, 302 or 303 executes an intercommunicating information read-out instruction (702), and consequently, whether the queue buffer 601 contains the intercommunicating information to be read out, is determined (703) by referring to one of the status detection registers 3010, 3020 and 3033 corresponding to the selected processor. When the reading is inhibited, the control is returned to the start 701, and the process is repeated. On the other hand, when the reading is possible, the intercommunicating information is read out, so that a jump to corresponding process (704) occurs and one of processes (process to process$_n$) 705 corresponding to the intercommunicating information is executed. After the process has been completed, the processor 301, 302 or 303 executes a write-in instruction (706) of the intercommunicating information relating to the process. In response to the execution (706) of the intercommunicating information write-in instruction, the processor performs determination (707) of whether it is possible to write in the intercommunicating information by referring to the contents of the corresponding status detection resistor. When the writing is not possible, the intercommunicating information write-in instruction is repeatedly executed until the writing is enabled at which time the control is returned to the start 701 and the processor becomes idle. In this way, the transmission and reception of process intercommunicating information among the processors can be accomplished without requiring accesses to the main memory unit 101 and without requiring intervention of the operating system.

Figure 2:
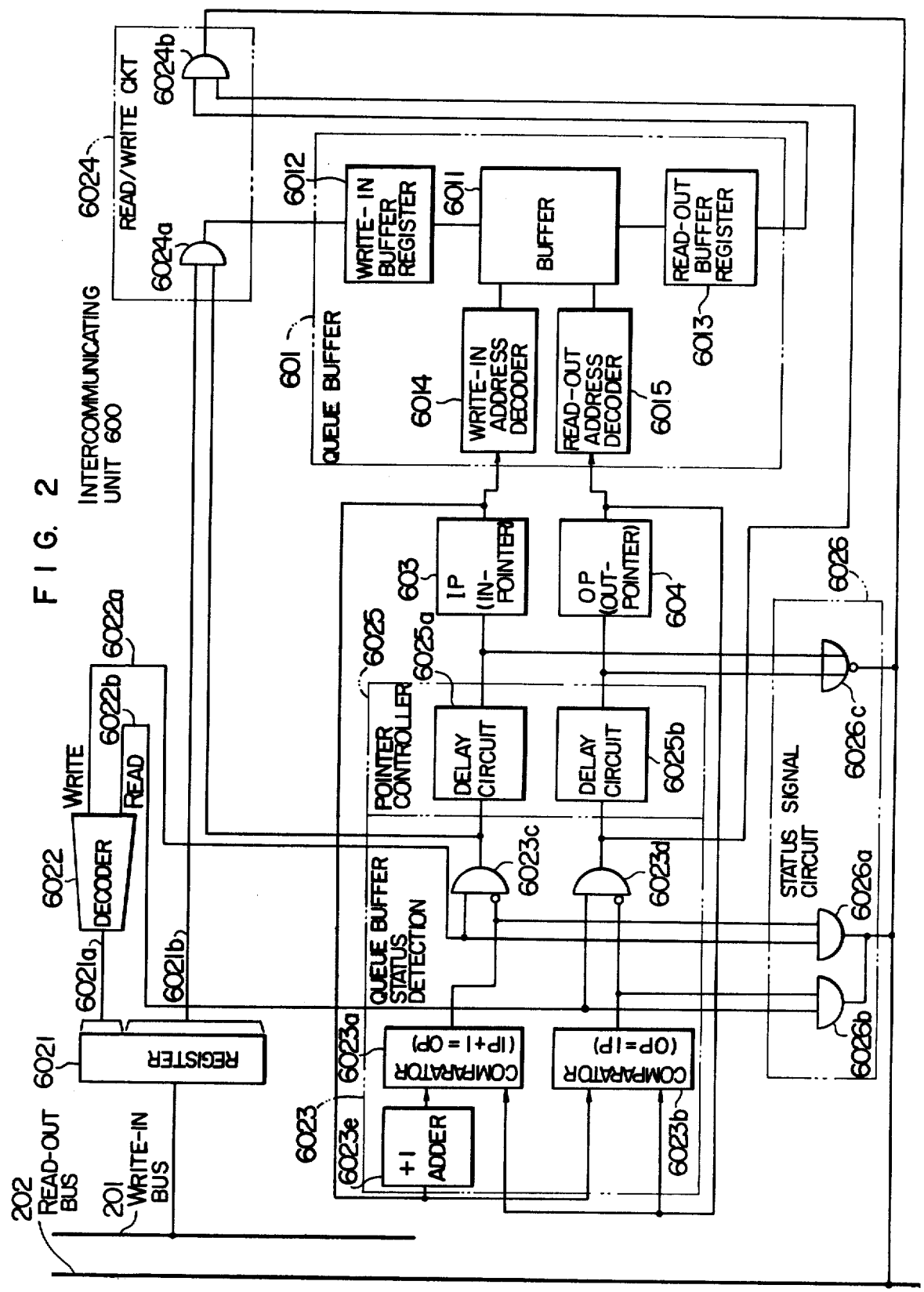
FIG. 2 is a detailed block diagram of the intercommunicating unit shown in FIG. 1.

Referring now to FIG. 2, the intercommunicating unit 600 will be described in greater detail. The queue buffer 601 comprises a buffer 6011 including a plurality of registers, a write-in buffer register 6012 for temporarily latching information to be written, a read-out buffer register 6013 for temporarily latching the information read out, a write-in address decoder 6014 and a read-out address decoder 6015, whereby the data in the buffer register 6012 is written into the register of the buffer 6011 which is designated by the write-in address decoder 6014, and the information in the register of the buffer 6011 which is designated by the read-out address register 6015 is read out to the buffer register 6013.

An input counter or in-pointer 603 and output counter or out-pointer 604 respectively having a counting capacity corresponding to the number of register stages in the buffer 6011, and for every reading or writing operation the out-pointer 604 or in-pointer 603 counts up from its initial value 0 until the count attains the number of the register stages at which the count is returned to 0. These counts are respectively applied to the address decoders 6014 and 6015.

A comparator 6023a compares the count value of the out-pointer 604 with the output of a +1 adder 6023e which adds 1 (one) to the count value of the in-pointer 603. When the two values are not equal to each other, the output of the comparator 6023a goes to a low level. In this case, an AND gate 6023c is opened so that if a write code 6022a is being applied to the AND gate 6023c, the AND gate 6023c generates a write enable signal. On the contrary, when the input values are equal to each other, the comparator 6023a generates a high level signal. While the existence of the equality or coincidence between the two input values means that there still exists one idle register in the buffer 6011, when the output values of the in-pointer 603 and the out-pointer 604 are simply compared for equality, the existence of the equality indicates that all registers in the buffers 6011 are idle as will be described hereunder. As a result, to distinguish these conditions from each other simply, when the number of idle registers in the buffer 6011 is reduced to only one and when the comparator 6023a generates a high level signal, it is considered to be an indication that writing into the buffer 6011 is not permitted. In this case, an AND gate 6026a of the status signal circuit 6026 is opened so that if the write code 6022a is being applied to the AND gate 6026a, a write inhibit signal is delivered to the read-out bus 202. The AND gate 6023c is also closed to inhibit the writing.

A comparator 6023b compares the count values of the in-pointer 603 and the out-pointer 604 to generate a low level signal when there exists the unequality between these values. In this case, an AND gate 6023d is opened so that if a read code 6022b is being applied to the AND gate 6023d, a read enable signal is generated from the AND gate 6023d. On the contrary, when there is the equality between the values, the comparator 6023b generates a high level signal. The existence of the equality between the count values of the in-pointer 603 and the out-pointer 604 is an indication that the buffer 6011 contains no information to be read out, that is, all the registers in the buffer 6011 are vacant. When a high level signal is generated, an AND gate 6026b is opened so that if the read code 6022b is being applied to the AND gate 6026b, a read inhibit signal is delivered to the read-out bus 202. Also the AND gate 6023d is closed to inhibit the reading.

A pointer controller 6025 comprises a delay circuit 6025a whereby a write enable signal from the queue buffer status detection circuit (QBSDC) 6023 is delayed until the completion of the writing into the queue buffer 603 and then the signal is generated as one which advances the count value of the in-pointer 601, and a delay circuit 6025b whereby a read enable signal applied from the QBSDC 6023 is delayed until the completion of the reading from the queue buffer 601 and then the signal is generated as one which advances the count value of the out-pointer 604.

Figure 3:
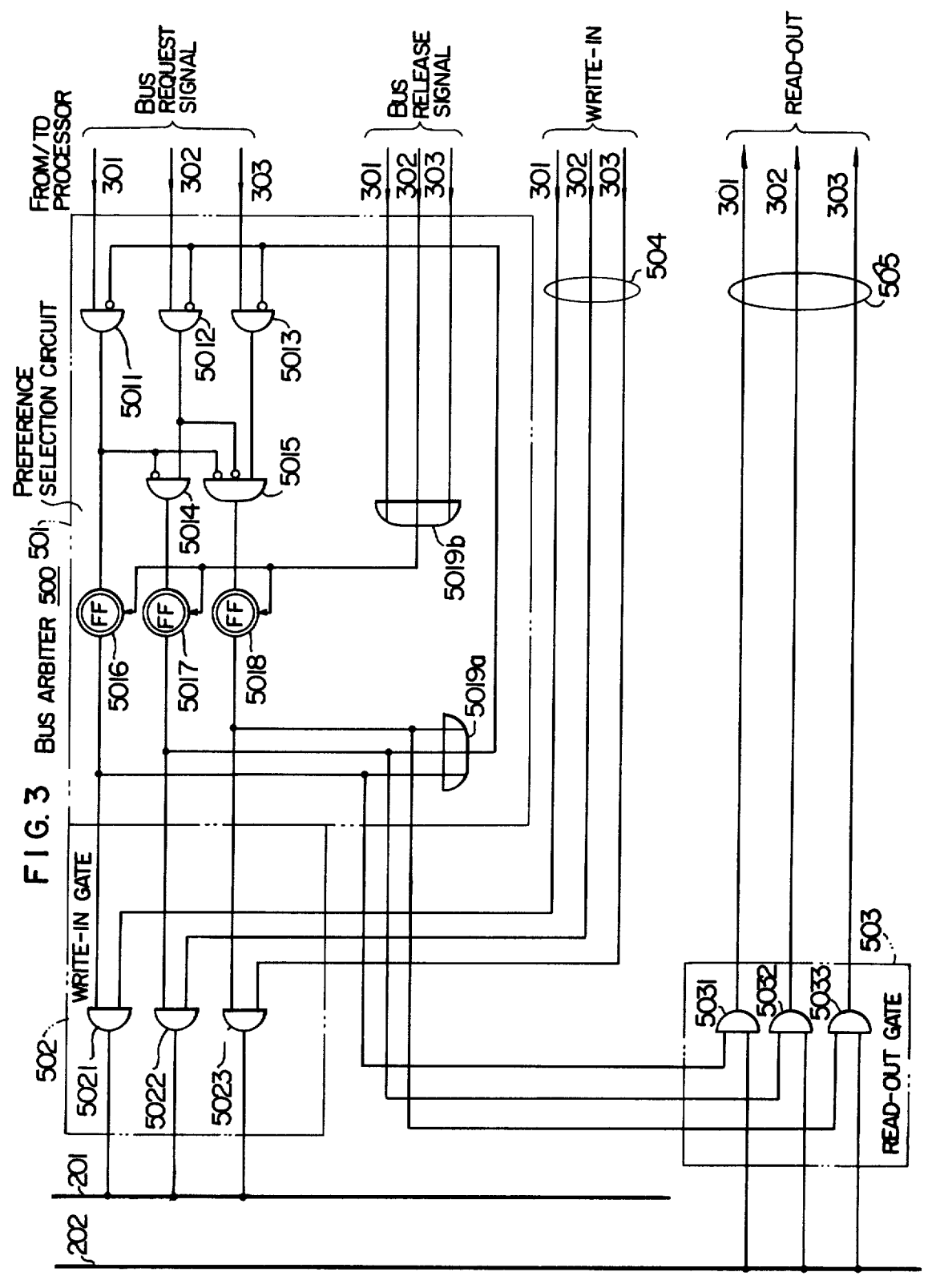

As shown in FIG. 3, the bus arbiter 500 comprises a preference selection circuit 501, a write-in gate 502 and a read-out gate 503. In the present embodiment, a priority order is preset in the preference selection circuit 501 to select the processors 301, 302 and 303 in this order. When a bus request signal is generated from any one or by every one of the processors 301 to 303 simultaneously, if the bus 200 has not been used by any of the processors, the output of an OR gate 5019a is at the low level so that the bus request signals are passed through AND gates 5011 to 5013 and the highest priority is given to the processor 301 thus setting only a flip-flop (FF) 5016 corresponding to the processor 301. When no request has been made by the processor 301, an AND gate 5014 is opened and consequently only an FF 5017 corresponding to the processor 302 is set. When there is also no request from the processor 302, an AND gate 5015 is opened and consequently only an FF 5018 corresponding to the processor 303 is set. It will thus be seen that only any one of the FF's 5016 to 5018 is always set. In this way, only any one of AND gates 5021 to 5023 in the write-in gate 502 and only any one of AND gates 5031 to 5033 in the read-out gate 503 are opened, and consequently only the preferentially selected one of the processors 301 to 303 is enabled to write information in the write-in bus 201 through a write-in line 504 or read out information from the read-out bus 202 through a read-out line 505. When a bus release signal is generated from the corresponding one of the processors 301 to 303 upon completion of the process, the FF's 5016 to 5018 are reset through an OR gate 5019b. More sepcifically, when the preferentially selected processor, e.g., the processor 301 completes a process and generates a bus release signal, the FF 5016 is reset and the flip-flop corresponding to the next processor, e.g., FF5017 is set.

The operation of this embodiment will now be described. The operation will be described first with reference to the case where an intercommunicating information write-in information is transmitted from one processor to the intercommunicating unit 600 through the write-in bus 201. As mentioned previously, this information comprises an operation code 6021a for specifying whether the request is a write-in request or read-out request and an intercommunicating information 6021b. The operation code 6021a is decoded by the decoder 6022 so that if the code is interpreted as specifying a write-in request, a write signal line 6022a goes to the high level. If at this time the output of the comparator 6023a is at the high level, the AND gate 6026a is opened to generate a signal which in turn is transmitted to the processor 301, 302 or 303 through the read-out bus 202 and the bus arbiter 500 as a signal indicating that the writing is inhibited. On the contrary, when the output of the comparator 6023a is at the low level, the AND gate 6023c is opened so that the resulting output signal of the AND gate 6023c is applied as a write enable signal to the read/write circuit 6024 and the AND gate 6024a is opened. When this occurs, the intercommunicating information 6021b is latched in the buffer register 6012 through the AND gate 6024a. The information in the buffer register 6012 is stored in that register in the buffer 6011 which is designated by the in-pointer 603. The delay time of the delay circuit 6025a is selected sufficient so that the information in the buffer register 6012 can be written into the buffer 6011 during the time interval, and the write enable signal is applied to the in-pointer 603 after this delay time. After the expiration of a time interval at which the writing of the information into the buffer 6011 from the buffer register 6012 can be considered complete, the count value of the in pointer 603 is increased by 1. Also the delayed write enable signal is applied from the delay circuit 6025a to the NOR gate 6026c which in turn generates a low level signal indicative of the completion of the writing.

Next, the operation of the embodiment will be described with reference to the case where any one of the processors 301 to 303 has made a request to read out the intercommunicating information. In this case, the processor in question sends only an operation code 6021a. This operation code is decoded by the decoder 6022 and consequently a read signal line 6022b goes to the high level. If at this time the output of the comparator 6023b is at the high level, the AND gate 6026b is opened and the resulting output signal of the AND gate 6026b is supplied as a read inhibit signal to the processor through the read-out bus 202 and the bus arbiter 500. On the contrary, when the output of the comparator 6023b is at the low level, the AND gate 6023d is opened so that the resulting output signal of the AND gate 6023d is applied as a read enable signal to the read/write circuit 6024 and the AND gate 6024b is opened. Consequently, the information in the read-out buffer register 6013 is read out and delivered through the AND gate 6024b to the read-out bus 202 from which the information is transmitted to the processor through the bus arbiter 500. Also the read enable signal is delayed by the delay circuit 6025b a sufficient time so that the delivery of the information from the buffer register 6013 to the read-out bus 202 can be completed, and then the signal is applied to the out-pointer 604 thus increasing its count value by 1. This value will be used to read out the next intercommunicating information from the buffer 6011 to the buffer register 6013. On the other hand, the NOR gate 6026c generates a low level signal indicative of the completion of the read-out, thus completing the reading operation.

While, in the embodiment, the buffer 6011 is constructed as described hereinbefore, the buffer 6011 is not limited to the illustrated arrangement. For instance, it may comprise a plurality of register stages to shift information sequentially from higher to lower stage registers. Information is always written into the highest stage register and it is read out from the lowest stage register. Each register has an indicator bit which indicates whether the register is idle, and information is shifted from a higher stage to a lower stage only when the latter is idle. In this way, the similar first-in first-out buffer control as in the case of the previously described embodiment can be accomplished.

It should also be appreciated by those skilled in the art that the present invention is limited to neither the load distributed control type multi-processors nor functionally distributed control type multi-processors, and moreover the present invention can be carried out utilizing both of the two types in combination.

We claim:

1. A stored program control type multiprocessor data processing system including a main memory unit having programs and data stored therein and a write-in bus and a read-out bus by which processors are connected to the main memory unit, said system comprising:
(1) a bus arbiter;
(2) a plurality of processors; and
(3) an intercommunicating unit;
   (1) said bus arbiter being connected between said processors and said write-in and read-out buses and comprising:
      (a) preference selection means for preferentially selecting any one of said processors according to a predetermined sequence when a bus request is made by every one of said processors simultaneously, and
      (b) means for connecting one of said processors selected by said preference selection circuit to said buses selectively, (2) said plurality of processors being disposed to be connected to said buses selectively and commonly through said bus arbiter, said processors being adapted so that when a particular process is executed by a selected one of said processors, said selected processor writes information relating to said particular process in said main memory unit and executes an intercommunicating information write-in instruction so that after execution of said particular process a first address of a storage area of said main memory unit having said information stored therein is supplied to said write-in bus as an intercommunicating information corresponding to said particular process or a successive process of another of said processors, said selected processor, when idle, executing an intercommunicating information readout instruction to execute a process corresponding to an intercommunicating information read out, (3) said intercommunicating unit comprising:
  (i) a queue buffer including:
    (a) a buffer comprising a plurality of registers and adapted to store intercommunicating information in a first-in first-out manner.
    (b) write-in address designating means for designating one of said registers in said buffer for writing intercommunicating information thereinto, and
    (c) read-out address designating means for designating one of said registers in said buffer for reading out intercommunicating information therefrom,
  (ii) control means including:
    (a) means disposed to receive an operation code and intercommunicating information from said write-in bus to discriminate one or the other of a write signal and a read signal in accordance with said operation code,
    (b) queue buffer status detecting means disposed to receive an input value to said write-in address designating means and an input value to said read-out address designating means for comparing the same, whereby upon reception of said write signal from discriminating means, when the presence of one or a predetermined number of registers in which intercommunicating information is unwritten in said buffer is identified as a result of the comparison a write enable signal is generated, and when the absence of such unwritten registers is identified a write inhibit signal is generated, while upon reception of said read signal from said discriminating means, when the presence of at least one register in which intercommunicating information is written in said buffer is identified as a result of said comparison a read enable signal is generated, and when the absence of such written register is identified a read inhibit signal is generated,
    (c) pointer control means disposed to selectively receive the write enable signal and the read enable signal from said queue buffer status detecting means to delay the same by at least a time sufficient to complete an operation of writing intercommunicating information into said queue buffer, and an operation of reading out intercommunicating information from said queue buffer and transmitting it to said read-out bus, respectively, and then applying it selectively to an in-pointer and out-pointer to thereby cause the same to count up,
    (d) said in-pointer having a counting capacity equal to the number of registers in said buffer and adapted to increase the count thereof by one in response to every write enable signal applied from said pointer control means and apply said count value to said write-in address designating means thereby causing the same to designate in accordance with said count value, a corresponding one of the registers in said buffer for writing intercommunicating information thereinto,
    (e) said out-pointer having a counting capacity equal to the number of registers in said buffer and adapted to increase the count thereof by one in response to every read enable signal from said pointer control means and apply said count value to said read-out address designating means thereby causing the same to designate in accordance with said count value, a corresponding one of the registers in said buffer for reading out intercommunicating information therefrom,
    (f) status signal means selectively responsive to said write signal, said read signal, said in-pointer count count-up signal and said out-pointer count count-up signal to selectively supply said write inhibit signal, said read inhibit signal, a write-in completion signal and a read-out completion signal to a selected one of said processors through said read-out bus, and
    (g) read/write control means responsive to said write enable signal to receive intercommunicating information from said discriminating means in said control means and supply the same to said queue buffer and responsive to said read enable signal to read out intercommunicating information from said queue buffer and supply the same to said read-out bus.

2. A stored program control type multiprocessor data processing system including a main memory unit having programs and data stored therein and a write-in bus and a read-out bus by which processors are connected to said main memory unit, said system comprising:
(1) a bus arbiter;
(2) a plurality of processors; and
(3) an intercommunicating unit;
  (1) said bus arbiter being connected between said processors and said write-in and read-out buses and comprising:
    (a) preference selection means for preferentially selecting any one of said processors according to a predetermined sequence when a bus request is made by every one of said processors simultaneously, and
    (b) means for connecting one of said processors selected by said preference selection means to said buses selectively,
  (2) said plurality of processors being disposed to be connected to said buses selectively and commonly through said bus arbiter, said processors being adapted so that when a particular process is executed by selected one of said processors, said selected processor writes information relating to said particular process in said main memory unit and executes an intercommunicating information write-in instruction so that after execution of said particular process a first address of a storage area of said main memory unit having said information stored therein is supplied to said write-in bus as an intercommunicating information corresponding to said particular process or a successive process of another of said processors, said selected processor, when idle, executing an intercommunicating information read-out instruction to execute a process corresponding to an intercommunicating information read out, (3) said intercommunicating unit comprising:
  (i) a queue buffer including:
    (a) a buffer comprising a plurality of registers and disposed to store intercommunicating information is a first-in first-out manner,
    (b) a write-in buffer register disposed to receive, latch temporarily and write intercommunicating information in said buffer,
    (c) a read-out buffer register disposed to temporarily latch intercommunicating information read out from said buffer,
    (d) a write-in address decoder disposed to designate one of the registers in said buffer for writing intercommunicating information thereinto,
    (e) a read-out address decoder disposed to designate one of the registers in said buffer for reading out intercommunicating information therefrom,
  (ii) control means including:
    (a) register means disposed to receive and latch an operation code and intercommunicating information from selected one of said processors through said bus arbiter,
    (b) decoder means disposed to receive said operation code from said register means to discriminate the same to selectively generate a write signal and a read signal,
    (c) queue buffer status detecting means disposed to receive and add one to an input value of said write-in address decoder and compare the same with an input value of said read-out address decoder whereby a write enable signal is generated when there exists no equality between said values and when said write signal is received from said decoder means, said detecting means further comparing the input values of said write-in and read-out address decoders whereby a read enable signal is generated when there exists no equality between said input values and when said read signal is received from said decoder means, said detecting means further generating a write inhibit signal and a read inhibit signal, respectively, when there exists the equality between said values and between said input values, respectively,
    (d) pointer control means disposed to selectively receive the write enable signal and the read enable signal from said queue buffer status detecting means to selectively apply the same, after a delay time sufficient to complete the writing of intercommunicating information into said queue buffer and the reading of intercommunicating information from said queue buffer and transmitting the same to said read-out bus, respectively, to an in-pointer and out-pointer to cause the same to count up,
    (e) said in-pointer having a counting capacity equal to the number of registers in said buffer and adapted to increase the count thereof by one in response to each reception of a write enable signal from said pointer control means and apply said count value to said write-in address decoder thereby causing the same to designate in accordance with said count value, a corresponding one of the registers in said buffer for writing intercommunicating information thereinto,
    (f) said out-pointer having a counter capacity equal to the number of registers in said buffer and adapted to increase the count thereof by one in response to each reception of a read enable signal from said pointer control means and apply said count value to said read-out address decoder thereby causing the same to designate in accordance with said count value, a corresponding one of the registers in said buffer for reading out intercommunicating information therefrom,
    (g) status signal means selectively responsive to said write signal, said read signal, said in-pointer count count-up signal and said out-pointer count count-up signal to selectively supply said write inhibit signal, said read inhibit signal, a write-in completion signal and a read-out completion signal to a selected one of said processors through said read-out bus, and
    (h) read/write control means responsive to said write enable signal to receive intercommunicating information from said register means and apply the same to said write-in buffer register in said queue buffer and responsive to said read enable signal to read out intercommunicating information from said read-out buffer register in said queue buffer and supply the same to said read-out bus.

3. A system according to claim 1, wherein each of said processors includes a status detection register and selectively responsive to said write and read inhibit signals to set the same in said status detection register, and wherein each said processor is adapted to repeatedly execute an intercommunicating processing instruction until one or the other of said write-in completion and read-out completion signals is received.

4. A system according to claim 2, wherein each of said processors includes a status detection register and selectively responsive to said write and read inhibit signals to set the same in said status detection register, and wherein each said processor is adapted to repeatedly execute an intercommunicating processing instruction until one or the other of said write-in completion and read-out completion signals is received.

5. A stored program control type multi-processor data processing system comprising:
(1) a main memory unit having programs and data stored therein,
(2) a write-in bus and a read-out bus which are connected to said main memory unit,
(3) a plurality of processors being disposed to be connected to said buses selectively, said processors being adapted so that when a particular process is executed by a selected one of said processors, said selected processor writes information relating to said particular process in said main memory unit and executes an intercommunicating information write-in instruction so that after execution of said particular process a first address of a storage area of said main memory unit having said information stored therein is supplied to said write-in bus as an intercommunicating information corresponding to said particular process or a successive process of another of said processors, said selected processor, when idle, executing an intercommunicating information read-out instruction to execute a process corresponding to an intercommunicating information read out, (4) a bus arbiter being connected between said processors and said write-in and read-out buses and comprising:
   (a) preference selection means for preferentially selecting any one of said processors according to a predetermined sequence when a bus request is made by every one of said processors simultaneously, and
   (b) means for connecting one of said processors selected by said preference selection circuit to said buses selectively, (5) an intercommunicating unit connected to said buses comprising:
   (i) a queue buffer including:
      (a) a buffer comprising a plurality of registers and adapted to store intercommunicating information in a first-in first-out manner,
      (b) write-in address designating means for designating one of said registers in said buffer for writing intercommunicating information thereinto, and
      (c) read-out address designating means for designating one of said registers in said buffer for reading out intercommunicating information therefrom,
   (ii) control means including:
      (a) means disposed to receive an operation code and interconnecting information from said write-in bus to discriminate one or the other of a write signal and a read signal in accordance with said operation code,
      (b) queue buffer status detecting means disposed to receive an input value to said write-in address designating means and an input value to said read-out address designating means for comparing the same, whereby upon reception of said write signal from discriminating means, when the presence of one or a predetermined number of registers in which intercommunicating information is unwritten in said buffer is identified as a result of the comparison a write enable signal is generated, and when the absence of such unwritten registers is identified a write inhibit signal is generated, while upon reception of said read signal from said discriminating means, when the presence of at least one register in which intercommunicating information is written in said buffer is identified as a result of said comparison a read enable signal is generated, and when the absence of such written register is identified a read inhibit signal is generated,
      (c) pointer control means disposed to selectively receive the write enable signal and the read enable signal from said queue buffer status detecting means to delay the same by at least a time sufficient to complete an operation of writing intercommunicating information into said queue buffer, and an operation of reading out intercommunicating information from said queue buffer and transmitting it to said read-out bus, respectively, and then applying it selectively to an in-pointer and an out-pointer to thereby cause the same to count up,
      (d) said in-pointer having a counting capacity equal to the number of registers in said buffer and adapted to increase the count thereof by one in response to every write enable signal applied from said pointer control means and apply said count value to said write-in address designating means thereby causing the same to designate in accordance with said count value, a corresponding one of the registers in said buffer for writing intercommunicating information thereinto,
      (e) said out-pointer having a counting capacity equal to the number of registers in said buffer and adapted to increase the count thereof by one in response to every read enable signal from said pointer control means and apply said count value to said read-out address designating means thereby causing the same to designate in accordance with said count value, a corresponding one of the registers in said buffer for reading out intercommunicating information therefrom,
      (f) status signal means selectively responsive to said write signal, said read signal, said in-pointer count count-up signal and said out-pointer count count-up signal to selectively supply said write inhibit signal, said read inhibit signal, a write-in completion signal and a read-out completion signal to a selected one of said processors through said read-out bus, and
      (g) read/write control means responsive to said write enable signal to receive intercommunicating information from said discriminating means in said control means and supply the same to said queue buffer and responsive to said read enable signal to read out intercommunicating information from said queue buffer and supply the same to said read-out bus.

* * * * *